Oct. 9, 1923.
B. M. W. HANSON
CHUCK
Filed March 24, 1922
1,469,833
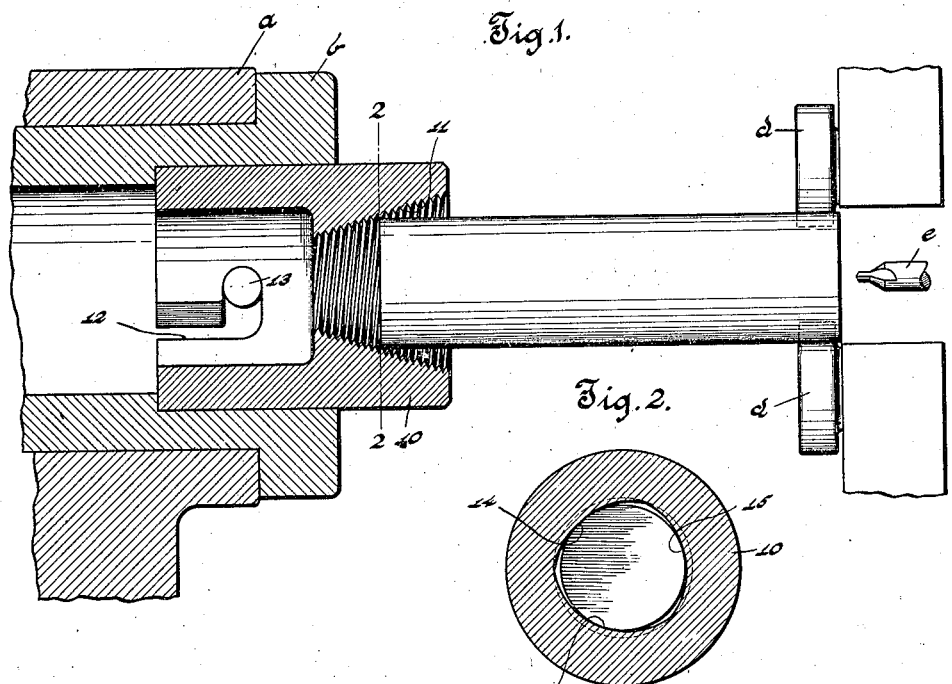
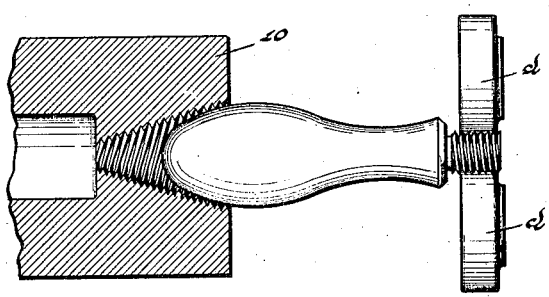
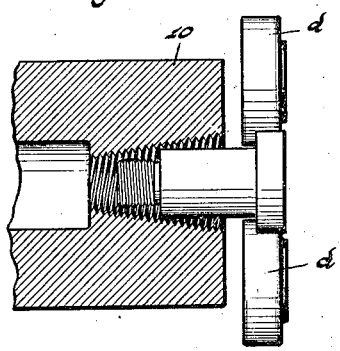
Inventor
Bengt M. W. Hanson
by T. Clay Lindsey
His Attorney Patented Oct. 9, 1923.

1,469,833

UNITED STATES PATENT OFFICE.

BENGT M. W. HANSON, OF HARTFORD, CONNECTICUT.

CHUCK.

Application filed March 24, 1922. Serial No. 546,294.

*To all whom it may concern:*

Be it known that I, BENGT M. W. HANSON, a citizen of the United States, and resident of Hartford, county of Hartford, State of Connecticut, have invented certain new and useful Improvements in a Chuck, of which the following is a specification.

This invention relates, generally, to chucks, for instance such as are employed for holding pieces of work or a tool on the spindle of a metal working machine.

The aim of the present invention is to provide a chuck which is particularly characterized by its extreme simplicity in construction permitting it to be very cheaply manufactured and by its effectiveness in operation in that the piece to be held is automatically centered and securely gripped by the mere act of inserting the piece into the chuck.

In the accompanying drawing, wherein I have shown for illustrative purposes several applications of the invention, Fig. 1 is a view showing my improved chuck applied to a centering machine, only so much of the machine being illustrated as is required to show one embodiment of the invention, and the chuck together with the spindle holding the same being in longitudinal central section;

Fig. 2 is a cross sectional view of the chuck taken substantially on line 2—2 of Fig. 1;

Figs. 3 and 4 are views similar to Fig. 1, but showing different kinds of pieces being held in the chuck.

Referring to the drawing in detail, $a$ denotes a suitable support or bearing member in which is journalled a rotary member $b$ here shown as being in the form of a hollow spindle. $d$, $d$ denote rollers which constitute a rest for supporting the free end of the work in proper position relative to the operating tool, this tool in the present instance being in the form of a center drill $e$. The structure so far described forms no part of the present invention, it being here illustrated merely for the purpose of showing one use to which my improved chuck may be put.

My improved chuck comprises a member 10 having a tapered recess or opening 11, the wall of which is provided with a thread preferably of relatively fine pitch. In the present illustrative disclosure of the invention, the wall of the recess 11 is provided with a triple thread, although it is to be understood that any desired number of threads may be used. In one manner of speaking, these threads constitute ribs or serrations having edges or teeth adapted to bite into the piece to be held. By preference, the chuck comprises a single block or piece of metal, thus permitting it to be manufactured at a very low cost. The chuck may be secured to the spindle in any suitable or desired manner, but by way of exemplification I have shown it as having a bayonet slot 12 adapted to receive a stud or pin 13 projecting from the internal periphery of the spindle $b$.

By providing the tapering wall of the chuck with a plurality of threads, it will be seen that when the work is positioned within the recess, the threads will grip the work at a plurality of angularly spaced apart points and hold the work in axial alinement with the center of rotation of the chuck and the spindle. Where a triple thread is provided, the work will be gripped at three points which are equally spaced relative to the axis of the chuck, as will be seen from Fig. 2, wherein the numerals 14, 15 and 16 denote the places where the respective threads engage the work. The chuck is of extreme simplicity and may be very economically manufactured and readily secured to the spindle. Any one chuck may be employed for holding pieces of work of various diameters within a given range. If desired, a number of chucks having threaded tapering openings of different sizes may be provided for insertion within the spindle so as to take care of pieces of work varying greatly in diameters or sizes from one another.

The chuck is adapted to hold pieces of work of different configurations and dimensions and finds many useful applications. For instance, the chuck may be used to hold a generally round or oval knob or handle, as shown in Fig. 3, or the shank of a bolt having a threaded stud at one end, as shown in Fig. 4. The chuck is provided with no relatively movable parts, and I have found that when the work is pushed into the tapered opening 11 of the chuck, it is automatically centered relative thereto and is securely held in centered position by the threads. Thus, the work may be very readily and quickly positioned in and removed from the chuck.

It is, of course, obvious that my invention is susceptible of various modifications and changes which are within the spirit of the invention without departing from the scope of the following claims, it being understood that the present disclosure of my invention is by way of illustration only and it is not to be taken as restrictive of my conception.

I claim as my invention:

1. A chuck having a tapered recess provided with a plurality of spiral ribs of relatively fine pitch.

2. A chuck having a tapered recess provided with at least three spiral ribs.

3. A chuck comprising a single integral member having a tapered recess, the wall of which is provided with three or more spiral ribs or serrations adapted to bite into the work at equi-angularly spaced points.

4. A chuck having a tapered recess provided with a plurality of thread ribs.

BENGT M. W. HANSON.